(12) United States Patent
Matsui

(10) Patent No.: US 7,119,807 B2
(45) Date of Patent: Oct. 10, 2006

(54) IMAGE PROCESSING APPARATUS AND IMAGE PROCESSING METHOD

(75) Inventor: Nobuaki Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/119,759

(22) Filed: Apr. 11, 2002

(65) Prior Publication Data

US 2002/0154134 A1   Oct. 24, 2002

(30) Foreign Application Priority Data

Apr. 24, 2001 (JP) ............................. 2001-126640
Mar. 20, 2002 (JP) ............................. 2002-078920

(51) Int. Cl.
*G06T 11/00* (2006.01)

(52) U.S. Cl. ...................... 345/468; 345/581; 345/611; 345/619; 382/176; 382/190; 382/194; 382/199; 382/266; 382/321

(58) Field of Classification Search ........ 382/199–200, 382/22, 275, 266, 194; 345/611, 634, 636, 345/644, 467, 660–671, 619–620, 643
See application file for complete search history.

(56) References Cited

U.S. PATENT DOCUMENTS 4,183,013 A * 1/1980 Agrawala et al. ........... 382/173
5,054,098 A * 10/1991 Lee ............................ 382/289
5,058,181 A * 10/1991 Ishihara et al. ............. 382/199
5,303,334 A * 4/1994 Snyder et al. ............... 358/1.9
5,471,568 A * 11/1995 Webb et al. ................. 382/199
5,491,759 A * 2/1996 Nagao et al. ................ 382/199
5,644,366 A * 7/1997 Ushida et al. ............... 348/625
5,664,027 A * 9/1997 Ittner .......................... 382/170
5,694,331 A * 12/1997 Yamamoto et al. ......... 345/428
5,732,248 A * 3/1998 Prouty et al. ................ 345/532
5,870,564 A * 2/1999 Jensen et al. ................ 709/241
5,872,864 A * 2/1999 Imade et al. ................. 382/176
5,902,987 A * 5/1999 Coffman et al. ....... 235/462.12
6,041,205 A * 3/2000 Funada et al. ............... 399/196

FOREIGN PATENT DOCUMENTS

JP  2000-137825  5/2000

* cited by examiner

*Primary Examiner*—Kee M. Tung
*Assistant Examiner*—Antonio Caschera
(74) *Attorney, Agent, or Firm*—Fitzpatrick, Cella, Harper & Scinto

(57) ABSTRACT

The present invention concerns an image processing apparatus and an image processing method, in which an edge coordinates extraction circuit is used to extract edge coordinates information for an input bitmap. By converting the bitmap image into vector data the edge coordinates information so extracted reduces the time required for raster-vector conversion.

15 Claims, 13 Drawing Sheets

FIG. 4

| BYTE DATA | NUMBER OF EDGE | EDGE POSITION ||||||||
|---|---|---|---|---|---|---|---|---|---|
| | | 1ST | 2ND | 3RD | 4TH | 5TH | 6TH | 7TH | 8TH |
| 0 | 0 | 0 | 0 | 0 | 0 | 0 | 0 | 0 | 0 |
| 1 | 1 | 7 | 0 | 0 | 0 | 0 | 0 | 0 | 0 |
| 2 | 2 | 6 | 7 | 0 | 0 | 0 | 0 | 0 | 0 |
| 3 | 1 | 6 | 0 | 0 | 0 | 0 | 0 | 0 | 0 |
| 4 | 2 | 5 | 6 | 0 | 0 | 0 | 0 | 0 | 0 |
| 5 | 3 | 5 | 6 | 7 | 0 | 0 | 0 | 0 | 0 |
| 6 | 2 | 5 | 7 | 0 | 0 | 0 | 0 | 0 | 0 |
| 7 | 1 | 5 | 0 | 0 | 0 | 0 | 0 | 0 | 0 |
| 8 | 2 | 4 | 5 | 0 | 0 | 0 | 0 | 0 | 0 |
| 9 | 3 | 4 | 5 | 7 | 0 | 0 | 0 | 0 | 0 |
| A | 4 | 4 | 5 | 6 | 7 | 0 | 0 | 0 | 0 |
| B | 3 | 4 | 5 | 6 | 0 | 0 | 0 | 0 | 0 |
| C | 2 | 4 | 6 | 0 | 0 | 0 | 0 | 0 | 0 |
| D | 3 | 4 | 6 | 7 | 0 | 0 | 0 | 0 | 0 |
| E | 2 | 4 | 7 | 0 | 0 | 0 | 0 | 0 | 0 |
| F | 1 | 4 | 0 | 0 | 0 | 0 | 0 | 0 | 0 |
| 10 | 2 | 3 | 4 | 0 | 0 | 0 | 0 | 0 | 0 |
| 11 | 3 | 3 | 4 | 7 | 0 | 0 | 0 | 0 | 0 |
| 12 | 4 | 3 | 4 | 6 | 7 | 0 | 0 | 0 | 0 |
| 13 | 3 | 3 | 4 | 6 | 0 | 0 | 0 | 0 | 0 |
| 14 | 4 | 3 | 4 | 5 | 6 | 0 | 0 | 0 | 0 |
| 15 | 5 | 3 | 4 | 5 | 6 | 7 | 0 | 0 | 0 |
| 16 | 4 | 3 | 4 | 5 | 7 | 0 | 0 | 0 | 0 |
| 17 | 3 | 3 | 4 | 5 | 0 | 0 | 0 | 0 | 0 |
| 18 | 2 | 3 | 5 | 0 | 0 | 0 | 0 | 0 | 0 |
| 19 | 3 | 3 | 5 | 7 | 0 | 0 | 0 | 0 | 0 |
| 1A | 4 | 3 | 5 | 6 | 7 | 0 | 0 | 0 | 0 |
| 1B | 3 | 3 | 5 | 6 | 0 | 0 | 0 | 0 | 0 |
| 1C | 2 | 3 | 6 | 0 | 0 | 0 | 0 | 0 | 0 |
| 1D | 3 | 3 | 6 | 7 | 0 | 0 | 0 | 0 | 0 |
| 1E | 2 | 3 | 7 | 0 | 0 | 0 | 0 | 0 | 0 |
| 1F | 1 | 3 | 0 | 0 | 0 | 0 | 0 | 0 | 0 |
| 20 | 2 | 2 | 3 | 0 | 0 | 0 | 0 | 0 | 0 |
| 21 | 3 | 2 | 3 | 7 | 0 | 0 | 0 | 0 | 0 |
| 22 | 4 | 2 | 3 | 6 | 7 | 0 | 0 | 0 | 0 |
| 23 | 3 | 2 | 3 | 6 | 0 | 0 | 0 | 0 | 0 |
| 24 | 4 | 2 | 3 | 5 | 6 | 0 | 0 | 0 | 0 |
| 25 | 5 | 2 | 3 | 5 | 6 | 7 | 0 | 0 | 0 |
| 26 | 4 | 2 | 3 | 5 | 7 | 0 | 0 | 0 | 0 |
| 27 | 3 | 2 | 3 | 5 | 0 | 0 | 0 | 0 | 0 |

FIG. 5

| BYTE DATA | NUMBER OF EDGE | EDGE POSITION | | | | | | | |
|---|---|---|---|---|---|---|---|---|---|
| | | 1ST | 2ND | 3RD | 4TH | 5TH | 6TH | 7TH | 8TH |
| 28 | 4 | 2 | 3 | 4 | 5 | 0 | 0 | 0 | 0 |
| 29 | 5 | 2 | 3 | 4 | 5 | 7 | 0 | 0 | 0 |
| 2A | 6 | 2 | 3 | 4 | 5 | 6 | 7 | 0 | 0 |
| 2B | 5 | 2 | 3 | 4 | 5 | 6 | 0 | 0 | 0 |
| 2C | 4 | 2 | 3 | 4 | 6 | 0 | 0 | 0 | 0 |
| 2D | 5 | 2 | 3 | 4 | 6 | 7 | 0 | 0 | 0 |
| 2E | 4 | 2 | 3 | 4 | 7 | 0 | 0 | 0 | 0 |
| 2F | 3 | 2 | 3 | 4 | 0 | 0 | 0 | 0 | 0 |
| 30 | 2 | 2 | 4 | 0 | 0 | 0 | 0 | 0 | 0 |
| 31 | 3 | 2 | 4 | 7 | 0 | 0 | 0 | 0 | 0 |
| 32 | 4 | 2 | 4 | 6 | 7 | 0 | 0 | 0 | 0 |
| 33 | 3 | 2 | 4 | 6 | 0 | 0 | 0 | 0 | 0 |
| 34 | 4 | 2 | 4 | 5 | 6 | 0 | 0 | 0 | 0 |
| 35 | 5 | 2 | 4 | 5 | 6 | 7 | 0 | 0 | 0 |
| 36 | 4 | 2 | 4 | 5 | 7 | 0 | 0 | 0 | 0 |
| 37 | 3 | 2 | 4 | 5 | 0 | 0 | 0 | 0 | 0 |
| 38 | 2 | 2 | 5 | 0 | 0 | 0 | 0 | 0 | 0 |
| 39 | 3 | 2 | 5 | 7 | 0 | 0 | 0 | 0 | 0 |
| 3A | 4 | 2 | 5 | 6 | 7 | 0 | 0 | 0 | 0 |
| 3B | 3 | 2 | 5 | 6 | 0 | 0 | 0 | 0 | 0 |
| 3C | 2 | 2 | 6 | 0 | 0 | 0 | 0 | 0 | 0 |
| 3D | 3 | 2 | 6 | 7 | 0 | 0 | 0 | 0 | 0 |
| 3E | 2 | 2 | 7 | 0 | 0 | 0 | 0 | 0 | 0 |
| 3F | 1 | 2 | 0 | 0 | 0 | 0 | 0 | 0 | 0 |
| 40 | 2 | 1 | 2 | 0 | 0 | 0 | 0 | 0 | 0 |
| 41 | 3 | 1 | 2 | 7 | 0 | 0 | 0 | 0 | 0 |
| 42 | 4 | 1 | 2 | 6 | 7 | 0 | 0 | 0 | 0 |
| 43 | 3 | 1 | 2 | 6 | 0 | 0 | 0 | 0 | 0 |
| 44 | 4 | 1 | 2 | 5 | 6 | 0 | 0 | 0 | 0 |
| 45 | 5 | 1 | 2 | 5 | 6 | 7 | 0 | 0 | 0 |
| 46 | 4 | 1 | 2 | 5 | 7 | 0 | 0 | 0 | 0 |
| 47 | 3 | 1 | 2 | 5 | 0 | 0 | 0 | 0 | 0 |
| 48 | 4 | 1 | 2 | 4 | 5 | 0 | 0 | 0 | 0 |
| 49 | 5 | 1 | 2 | 4 | 5 | 7 | 0 | 0 | 0 |
| 4A | 6 | 1 | 2 | 4 | 5 | 6 | 7 | 0 | 0 |
| 4B | 5 | 1 | 2 | 4 | 5 | 6 | 0 | 0 | 0 |
| 4C | 4 | 1 | 2 | 4 | 6 | 0 | 0 | 0 | 0 |
| 4D | 5 | 1 | 2 | 4 | 6 | 7 | 0 | 0 | 0 |
| 4E | 4 | 1 | 2 | 4 | 7 | 0 | 0 | 0 | 0 |
| 4F | 3 | 1 | 2 | 4 | 0 | 0 | 0 | 0 | 0 |
| 50 | 4 | 1 | 2 | 3 | 4 | 0 | 0 | 0 | 0 |
| 51 | 5 | 1 | 2 | 3 | 4 | 7 | 0 | 0 | 0 |
| 52 | 6 | 1 | 2 | 3 | 4 | 6 | 7 | 0 | 0 |
| 53 | 5 | 1 | 2 | 3 | 4 | 6 | 0 | 0 | 0 |

FIG. 6

| BYTE DATA | NUMBER OF EDGE | EDGE POSITION | | | | | | | |
|---|---|---|---|---|---|---|---|---|---|
| | | 1ST | 2ND | 3RD | 4TH | 5TH | 6TH | 7TH | 8TH |
| 54 | 6 | 1 | 2 | 3 | 4 | 5 | 6 | 0 | 0 |
| 55 | 7 | 1 | 2 | 3 | 4 | 5 | 6 | 7 | 0 |
| 56 | 6 | 1 | 2 | 3 | 4 | 5 | 7 | 0 | 0 |
| 57 | 5 | 1 | 2 | 3 | 4 | 5 | 0 | 0 | 0 |
| 58 | 4 | 1 | 2 | 3 | 5 | 0 | 0 | 0 | 0 |
| 59 | 5 | 1 | 2 | 3 | 5 | 7 | 0 | 0 | 0 |
| 5A | 6 | 1 | 2 | 3 | 5 | 6 | 7 | 0 | 0 |
| 5B | 5 | 1 | 2 | 3 | 5 | 6 | 0 | 0 | 0 |
| 5C | 4 | 1 | 2 | 3 | 6 | 0 | 0 | 0 | 0 |
| 5D | 5 | 1 | 2 | 3 | 6 | 7 | 0 | 0 | 0 |
| 5E | 4 | 1 | 2 | 3 | 7 | 0 | 0 | 0 | 0 |
| 5F | 3 | 1 | 2 | 3 | 0 | 0 | 0 | 0 | 0 |
| 60 | 2 | 1 | 3 | 0 | 0 | 0 | 0 | 0 | 0 |
| 61 | 3 | 1 | 3 | 7 | 0 | 0 | 0 | 0 | 0 |
| 62 | 4 | 1 | 3 | 6 | 7 | 0 | 0 | 0 | 0 |
| 63 | 3 | 1 | 3 | 6 | 0 | 0 | 0 | 0 | 0 |
| 64 | 4 | 1 | 3 | 5 | 6 | 0 | 0 | 0 | 0 |
| 65 | 5 | 1 | 3 | 5 | 6 | 7 | 0 | 0 | 0 |
| 66 | 4 | 1 | 3 | 5 | 7 | 0 | 0 | 0 | 0 |
| 67 | 3 | 1 | 3 | 5 | 0 | 0 | 0 | 0 | 0 |
| 68 | 4 | 1 | 3 | 4 | 5 | 0 | 0 | 0 | 0 |
| 69 | 5 | 1 | 3 | 4 | 5 | 7 | 0 | 0 | 0 |
| 6A | 6 | 1 | 3 | 4 | 5 | 6 | 7 | 0 | 0 |
| 6B | 5 | 1 | 3 | 4 | 5 | 6 | 0 | 0 | 0 |
| 6C | 4 | 1 | 3 | 4 | 6 | 0 | 0 | 0 | 0 |
| 6D | 5 | 1 | 3 | 4 | 6 | 7 | 0 | 0 | 0 |
| 6E | 4 | 1 | 3 | 4 | 7 | 0 | 0 | 0 | 0 |
| 6F | 3 | 1 | 3 | 4 | 0 | 0 | 0 | 0 | 0 |
| 70 | 2 | 1 | 4 | 0 | 0 | 0 | 0 | 0 | 0 |
| 71 | 3 | 1 | 4 | 7 | 0 | 0 | 0 | 0 | 0 |
| 72 | 4 | 1 | 4 | 6 | 7 | 0 | 0 | 0 | 0 |
| 73 | 3 | 1 | 4 | 6 | 0 | 0 | 0 | 0 | 0 |
| 74 | 4 | 1 | 4 | 5 | 6 | 0 | 0 | 0 | 0 |
| 75 | 5 | 1 | 4 | 5 | 6 | 7 | 0 | 0 | 0 |
| 76 | 4 | 1 | 4 | 5 | 7 | 0 | 0 | 0 | 0 |
| 77 | 3 | 1 | 4 | 5 | 0 | 0 | 0 | 0 | 0 |
| 78 | 2 | 1 | 5 | 0 | 0 | 0 | 0 | 0 | 0 |
| 79 | 3 | 1 | 5 | 7 | 0 | 0 | 0 | 0 | 0 |
| 7A | 4 | 1 | 5 | 6 | 7 | 0 | 0 | 0 | 0 |
| 7B | 3 | 1 | 5 | 6 | 0 | 0 | 0 | 0 | 0 |
| 7C | 2 | 1 | 6 | 0 | 0 | 0 | 0 | 0 | 0 |
| 7D | 3 | 1 | 6 | 7 | 0 | 0 | 0 | 0 | 0 |
| 7E | 2 | 1 | 7 | 0 | 0 | 0 | 0 | 0 | 0 |
| 7F | 1 | 1 | 0 | 0 | 0 | 0 | 0 | 0 | 0 |

FIG. 7

| BYTE DATA | NUMBER OF EDGE | EDGE POSITION | | | | | | | |
|---|---|---|---|---|---|---|---|---|---|
| | | 1ST | 2ND | 3RD | 4TH | 5TH | 6TH | 7TH | 8TH |
| 80 | 2 | 0 | 1 | 0 | 0 | 0 | 0 | 0 | 0 |
| 81 | 3 | 0 | 1 | 7 | 0 | 0 | 0 | 0 | 0 |
| 82 | 4 | 0 | 1 | 6 | 7 | 0 | 0 | 0 | 0 |
| 83 | 3 | 0 | 1 | 6 | 0 | 0 | 0 | 0 | 0 |
| 84 | 4 | 0 | 1 | 5 | 6 | 0 | 0 | 0 | 0 |
| 85 | 5 | 0 | 1 | 5 | 6 | 7 | 0 | 0 | 0 |
| 86 | 4 | 0 | 1 | 5 | 7 | 0 | 0 | 0 | 0 |
| 87 | 3 | 0 | 1 | 5 | 0 | 0 | 0 | 0 | 0 |
| 88 | 4 | 0 | 1 | 4 | 5 | 0 | 0 | 0 | 0 |
| 89 | 5 | 0 | 1 | 4 | 5 | 7 | 0 | 0 | 0 |
| 8A | 6 | 0 | 1 | 4 | 5 | 6 | 7 | 0 | 0 |
| 8B | 5 | 0 | 1 | 4 | 5 | 6 | 0 | 0 | 0 |
| 8C | 4 | 0 | 1 | 4 | 6 | 0 | 0 | 0 | 0 |
| 8D | 5 | 0 | 1 | 4 | 6 | 7 | 0 | 0 | 0 |
| 8E | 4 | 0 | 1 | 4 | 7 | 0 | 0 | 0 | 0 |
| 8F | 3 | 0 | 1 | 4 | 0 | 0 | 0 | 0 | 0 |
| 90 | 4 | 0 | 1 | 3 | 4 | 0 | 0 | 0 | 0 |
| 91 | 5 | 0 | 1 | 3 | 4 | 7 | 0 | 0 | 0 |
| 92 | 6 | 0 | 1 | 3 | 4 | 6 | 7 | 0 | 0 |
| 93 | 5 | 0 | 1 | 3 | 4 | 6 | 0 | 0 | 0 |
| 94 | 6 | 0 | 1 | 3 | 4 | 5 | 6 | 0 | 0 |
| 95 | 7 | 0 | 1 | 3 | 4 | 5 | 6 | 7 | 0 |
| 96 | 6 | 0 | 1 | 3 | 4 | 5 | 7 | 0 | 0 |
| 97 | 5 | 0 | 1 | 3 | 4 | 5 | 0 | 0 | 0 |
| 98 | 4 | 0 | 1 | 3 | 5 | 0 | 0 | 0 | 0 |
| 99 | 5 | 0 | 1 | 3 | 5 | 7 | 0 | 0 | 0 |
| 9A | 6 | 0 | 1 | 3 | 5 | 6 | 7 | 0 | 0 |
| 9B | 5 | 0 | 1 | 3 | 5 | 6 | 0 | 0 | 0 |
| 9C | 4 | 0 | 1 | 3 | 6 | 0 | 0 | 0 | 0 |
| 9D | 5 | 0 | 1 | 3 | 6 | 7 | 0 | 0 | 0 |
| 9E | 4 | 0 | 1 | 3 | 7 | 0 | 0 | 0 | 0 |
| 9F | 3 | 0 | 1 | 3 | 0 | 0 | 0 | 0 | 0 |
| A0 | 4 | 0 | 1 | 2 | 3 | 0 | 0 | 0 | 0 |
| A1 | 5 | 0 | 1 | 2 | 3 | 7 | 0 | 0 | 0 |
| A2 | 6 | 0 | 1 | 2 | 3 | 6 | 7 | 0 | 0 |
| A3 | 5 | 0 | 1 | 2 | 3 | 6 | 0 | 0 | 0 |
| A4 | 6 | 0 | 1 | 2 | 3 | 5 | 6 | 0 | 0 |
| A5 | 7 | 0 | 1 | 2 | 3 | 5 | 6 | 7 | 0 |
| A6 | 6 | 0 | 1 | 2 | 3 | 5 | 7 | 0 | 0 |
| A7 | 5 | 0 | 1 | 2 | 3 | 5 | 0 | 0 | 0 |
| A8 | 6 | 0 | 1 | 2 | 3 | 4 | 5 | 0 | 0 |
| A9 | 7 | 0 | 1 | 2 | 3 | 4 | 5 | 7 | 0 |
| AA | 8 | 0 | 1 | 2 | 3 | 4 | 5 | 6 | 7 |
| AB | 7 | 0 | 1 | 2 | 3 | 4 | 5 | 6 | 0 |

FIG. 8

| BYTE DATA | NUMBER OF EDGE | EDGE POSITION | | | | | | | |
|---|---|---|---|---|---|---|---|---|---|
| | | 1ST | 2ND | 3RD | 4TH | 5TH | 6TH | 7TH | 8TH |
| AC | 6 | 0 | 1 | 2 | 3 | 4 | 6 | 0 | 0 |
| AD | 7 | 0 | 1 | 2 | 3 | 4 | 6 | 7 | 0 |
| AE | 6 | 0 | 1 | 2 | 3 | 4 | 7 | 0 | 0 |
| AF | 5 | 0 | 1 | 2 | 3 | 4 | 0 | 0 | 0 |
| B0 | 4 | 0 | 1 | 2 | 4 | 0 | 0 | 0 | 0 |
| B1 | 5 | 0 | 1 | 2 | 4 | 7 | 0 | 0 | 0 |
| B2 | 6 | 0 | 1 | 2 | 4 | 6 | 7 | 0 | 0 |
| B3 | 5 | 0 | 1 | 2 | 4 | 6 | 0 | 0 | 0 |
| B4 | 6 | 0 | 1 | 2 | 4 | 5 | 6 | 0 | 0 |
| B5 | 7 | 0 | 1 | 2 | 4 | 5 | 6 | 7 | 0 |
| B6 | 6 | 0 | 1 | 2 | 4 | 5 | 7 | 0 | 0 |
| B7 | 5 | 0 | 1 | 2 | 4 | 5 | 0 | 0 | 0 |
| B8 | 4 | 0 | 1 | 2 | 5 | 0 | 0 | 0 | 0 |
| B9 | 5 | 0 | 1 | 2 | 5 | 7 | 0 | 0 | 0 |
| BA | 6 | 0 | 1 | 2 | 5 | 6 | 7 | 0 | 0 |
| BB | 5 | 0 | 1 | 2 | 5 | 6 | 0 | 0 | 0 |
| BC | 4 | 0 | 1 | 2 | 6 | 0 | 0 | 0 | 0 |
| BD | 5 | 0 | 1 | 2 | 6 | 7 | 0 | 0 | 0 |
| BE | 4 | 0 | 1 | 2 | 7 | 0 | 0 | 0 | 0 |
| BF | 3 | 0 | 1 | 2 | 0 | 0 | 0 | 0 | 0 |
| C0 | 2 | 0 | 2 | 0 | 0 | 0 | 0 | 0 | 0 |
| C1 | 3 | 0 | 2 | 7 | 0 | 0 | 0 | 0 | 0 |
| C2 | 4 | 0 | 2 | 6 | 7 | 0 | 0 | 0 | 0 |
| C3 | 3 | 0 | 2 | 6 | 0 | 0 | 0 | 0 | 0 |
| C4 | 4 | 0 | 2 | 5 | 6 | 0 | 0 | 0 | 0 |
| C5 | 5 | 0 | 2 | 5 | 6 | 7 | 0 | 0 | 0 |
| C6 | 4 | 0 | 2 | 5 | 7 | 0 | 0 | 0 | 0 |
| C7 | 3 | 0 | 2 | 5 | 0 | 0 | 0 | 0 | 0 |
| C8 | 4 | 0 | 2 | 4 | 5 | 0 | 0 | 0 | 0 |
| C9 | 5 | 0 | 2 | 4 | 5 | 7 | 0 | 0 | 0 |
| CA | 6 | 0 | 2 | 4 | 5 | 6 | 7 | 0 | 0 |
| CB | 5 | 0 | 2 | 4 | 5 | 6 | 0 | 0 | 0 |
| CC | 4 | 0 | 2 | 4 | 6 | 0 | 0 | 0 | 0 |
| CD | 5 | 0 | 2 | 4 | 6 | 7 | 0 | 0 | 0 |
| CE | 4 | 0 | 2 | 4 | 7 | 0 | 0 | 0 | 0 |
| CF | 3 | 0 | 2 | 4 | 0 | 0 | 0 | 0 | 0 |
| D0 | 4 | 0 | 2 | 3 | 4 | 0 | 0 | 0 | 0 |
| D1 | 5 | 0 | 2 | 3 | 4 | 7 | 0 | 0 | 0 |
| D2 | 6 | 0 | 2 | 3 | 4 | 6 | 7 | 0 | 0 |
| D3 | 5 | 0 | 2 | 3 | 4 | 6 | 0 | 0 | 0 |
| D4 | 6 | 0 | 2 | 3 | 4 | 5 | 6 | 0 | 0 |
| D5 | 7 | 0 | 2 | 3 | 4 | 5 | 6 | 7 | 0 |
| D6 | 6 | 0 | 2 | 3 | 4 | 5 | 7 | 0 | 0 |
| D7 | 5 | 0 | 2 | 3 | 4 | 5 | 0 | 0 | 0 |

FIG. 9

| BYTE DATA | NUMBER OF EDGE | EDGE POSITION | | | | | | | |
|---|---|---|---|---|---|---|---|---|---|
| | | 1ST | 2ND | 3RD | 4TH | 5TH | 6TH | 7TH | 8TH |
| D8 | 4 | 0 | 2 | 3 | 5 | 0 | 0 | 0 | 0 |
| D9 | 5 | 0 | 2 | 3 | 5 | 7 | 0 | 0 | 0 |
| DA | 6 | 0 | 2 | 3 | 5 | 6 | 7 | 0 | 0 |
| DB | 5 | 0 | 2 | 3 | 5 | 6 | 0 | 0 | 0 |
| DC | 4 | 0 | 2 | 3 | 6 | 0 | 0 | 0 | 0 |
| DD | 5 | 0 | 2 | 3 | 6 | 7 | 0 | 0 | 0 |
| DE | 4 | 0 | 2 | 3 | 7 | 0 | 0 | 0 | 0 |
| DF | 3 | 0 | 2 | 3 | 0 | 0 | 0 | 0 | 0 |
| E0 | 2 | 0 | 3 | 0 | 0 | 0 | 0 | 0 | 0 |
| E1 | 3 | 0 | 3 | 7 | 0 | 0 | 0 | 0 | 0 |
| E2 | 4 | 0 | 3 | 6 | 7 | 0 | 0 | 0 | 0 |
| E3 | 3 | 0 | 3 | 6 | 0 | 0 | 0 | 0 | 0 |
| E4 | 4 | 0 | 3 | 5 | 6 | 0 | 0 | 0 | 0 |
| E5 | 5 | 0 | 3 | 5 | 6 | 7 | 0 | 0 | 0 |
| E6 | 4 | 0 | 3 | 5 | 7 | 0 | 0 | 0 | 0 |
| E7 | 3 | 0 | 3 | 5 | 0 | 0 | 0 | 0 | 0 |
| E8 | 4 | 0 | 3 | 4 | 5 | 0 | 0 | 0 | 0 |
| E9 | 5 | 0 | 3 | 4 | 5 | 7 | 0 | 0 | 0 |
| EA | 6 | 0 | 3 | 4 | 5 | 6 | 7 | 0 | 0 |
| EB | 5 | 0 | 3 | 4 | 5 | 6 | 0 | 0 | 0 |
| EC | 4 | 0 | 3 | 4 | 6 | 0 | 0 | 0 | 0 |
| ED | 5 | 0 | 3 | 4 | 6 | 7 | 0 | 0 | 0 |
| EE | 4 | 0 | 3 | 4 | 7 | 0 | 0 | 0 | 0 |
| EF | 3 | 0 | 3 | 4 | 0 | 0 | 0 | 0 | 0 |
| F0 | 2 | 0 | 4 | 0 | 0 | 0 | 0 | 0 | 0 |
| F1 | 3 | 0 | 4 | 7 | 0 | 0 | 0 | 0 | 0 |
| F2 | 4 | 0 | 4 | 6 | 7 | 0 | 0 | 0 | 0 |
| F3 | 3 | 0 | 4 | 6 | 0 | 0 | 0 | 0 | 0 |
| F4 | 4 | 0 | 4 | 5 | 6 | 0 | 0 | 0 | 0 |
| F5 | 5 | 0 | 4 | 5 | 6 | 7 | 0 | 0 | 0 |
| F6 | 4 | 0 | 4 | 5 | 7 | 0 | 0 | 0 | 0 |
| F7 | 3 | 0 | 4 | 5 | 0 | 0 | 0 | 0 | 0 |
| F8 | 2 | 0 | 5 | 0 | 0 | 0 | 0 | 0 | 0 |
| F9 | 3 | 0 | 5 | 7 | 0 | 0 | 0 | 0 | 0 |
| FA | 4 | 0 | 5 | 6 | 7 | 0 | 0 | 0 | 0 |
| FB | 3 | 0 | 5 | 6 | 0 | 0 | 0 | 0 | 0 |
| FC | 2 | 0 | 6 | 0 | 0 | 0 | 0 | 0 | 0 |
| FD | 3 | 0 | 6 | 7 | 0 | 0 | 0 | 0 | 0 |
| FE | 2 | 0 | 7 | 0 | 0 | 0 | 0 | 0 | 0 |
| FF | 1 | 0 | 0 | 0 | 0 | 0 | 0 | 0 | 0 |

IMAGE PROCESSING APPARATUS AND IMAGE PROCESSING METHOD

FIELD OF THE INVENTION

The present invention relates to an image processing apparatus and image processing method for processing an input bitmap image.

BACKGROUND OF THE INVENTION

Conventionally, printers and other image processing systems that process page description languages (PDL) such as Postscript, LIPS, PCL and the like have a band buffer, page buffer or other such frame buffer, with objects to be drawn being rendered in the frame buffer. In such a method, in order to draw a single object from among a plurality of objects in the frame buffer, images surrounding the image to be drawn are read from a memory that is the frame buffer, combined with the object to be drawn and rewritten to the memory, with such a process being repeated until all the objects are drawn. As a result, the memory that is the frame buffer is subjected to a large volume of read-modify-write processing, and accordingly, when the printer resolution is high or when the fineness of the imaging is enhanced (as in the case of a color printer), either the amount of time required to render the object in the memory or the required memory bandwidth increase dramatically.

In order to overcome such a drawback, a rendering method that generates final pixel information directly from the edge information and the layer information of the objects to be drawn has been proposed in Japanese Laid-Open Patent Application No. Ser. 2000-137825. In this method, what kinds of objects exist is determined from the object edge information, and then what object exists on the surface is determined from the layering of the objects, and finally, from the color information of the object resting on top, the color of the current pixel is determined. Production of each and every pixel is carried out in a similar manner, one pixel at a time. As a result, the need to carry out large volumes of read-modify-write operations when rendering the object in the memory is eliminated. The advantage thus gained is that the time needed for rendering does not increase dramatically even if the resolution and fineness increase.

However, with the method described above, edge information for the object must be obtained prior to rendering the object. Many alphanumeric characters are included in any textual matter to be printed, for example, but even so it is necessary to obtain edge information for the character font objects. Given the large variety of alphanumeric characters and the complexity of their edges, a drawback arises in that extensive time is required for the edge extraction process.

Additionally, the typical bitmap font is a binary bitmap image, and the process of extracting edges from a binary bitmap image amounts to bit processing. As a result, processing with an ordinary CPU requires a large number of cycles, making it difficult to carry out such processing at high speed.

Additionally, problems with the edge extraction process are not limited to the above-described rendering but occur also in the execution of raster-to-vector conversion in so-called optical character recognition (OCR) operations.

In other words, when performing OCR on an image scanned from a scanner, the raster image is converted into a vector image. The first part of such raster-to-vector conversion involves scanning each pixel of the raster image and establishing the coordinates of points where the density of the pixels changes (in other words, the edges of the image). The last part of the raster-to-vector conversion involves deducing the relationship between a plurality of edges from the edge coordinates so established so as to produce vectors. Conventionally, the entire raster-to-vector conversion process, including the above-described process of establishing coordinates, has been carried out using CPU software.

In OCR, the raster image to be processed is often a binary bitmap image. In the process of scanning the pixels of the binary bitmap image, a large amount of bit processing must be carried out, and in the ordinary CPU such bit processing requires a large number of cycles. As a result, the conventional problem remains insofar as the raster-to-vector conversion still requires substantial periods of time in order to be accomplished.

SUMMARY OF THE INVENTION

Accordingly, the present invention has as its object to provide an image processing apparatus and an image processing method that solve the above-described problems of the conventional art.

Another and more specific object of the present invention is to provide an image processing apparatus and image processing method capable of conducting raster-to-vector conversion at high speed.

The above-described objects of the present invention are achieved by an image processing apparatus for processing an input bitmap image, the image processing apparatus comprising:

an edge coordinates extraction circuit for extracting edge coordinates information of the input bitmap image; and conversion means for converting the bitmap image into vector data based on the edge coordinates information.

Additionally, the above-described objects of the present invention are achieved by an image processing apparatus for processing an input bitmap image, the image processing apparatus comprising:

an edge coordinates extraction circuit for extracting edge coordinates information of the input bitmap image; and a CPU for converting the bitmap image into vector data based on the edge coordinates information, the edge coordinates extraction circuit for extracting edge coordinates information of the input bitmap image executing a hardware process and the CPU for converting the bitmap image into vector data based on the edge coordinates information executing a software process.

Additionally, the above-described objects of the present invention are achieved by an image processing apparatus for processing an input bitmap image, the image processing apparatus comprising:

an edge coordinates extraction circuit for extracting edge coordinates information of the input bitmap image; and a first generating means for generating edge information of a graphic object based on the edge coordinates information.

Additionally, the above-described objects of the present invention are achieved by an image processing apparatus for processing an input bitmap image, the image processing apparatus comprising:

an edge coordinates extraction circuit for extracting edge coordinates information of the input bitmap image; and a CPU for converting the bitmap image into vector data based on the edge coordinates information, the edge coordinates extraction circuit for extracting edge coordinates information of the input bitmap image executing a hardware process and the CPU for converting the bitmap image into vector data based on the edge coordinates information executing a software process.

Additionally, the above-described objects of the present invention are achieved by an image processing apparatus comprising:

input means for inputting a bitmap image; and an edge coordinates extraction circuit for extracting edge coordinates information of the bitmap image input by the input means.

Other objects, features and advantages of the present invention besides those discussed above shall be apparent to those skilled in the art from the description of preferred embodiments of the invention that follows with reference to the accompanying drawings.

BRIEF DESCRIPTION OF THE DRAWINGS

FIG. 4 is a table of truth values showing operation of a decoder circuit of an embodiment of the present invention;

FIG. 5 is a table of truth values showing operation of a decoder circuit of an embodiment of the present invention;

FIG. 6 is a table of truth values showing operation of a decoder circuit of an embodiment of the present invention;

FIG. 7 is a table of truth values showing operation of a decoder circuit of an embodiment of the present invention;

FIG. 8 is a table of truth values showing operation of a decoder circuit of an embodiment of the present invention;

FIG. 9 is a table of truth values showing operation of a decoder circuit of an embodiment of the present invention;

DETAILED DESCRIPTION OF THE PREFERRED EMBODIMENTS

A detailed description will now be given of an image processing apparatus according to a first embodiment of the present invention, with reference to the accompanying drawings.

The image processing apparatus according to the first embodiment employs an edge coordinates extraction circuit using a decoder to carry out bitmap edge coordinate conversion in order to increase the speed of the first part of the raster-to-vector conversion. Moreover, the execution of the last part of the process using software loaded into a CPU is made to overlap and therefore partially parallel that of the first part of the process, thereby shortening the time required for raster-to-vector conversion.

Figure 1:
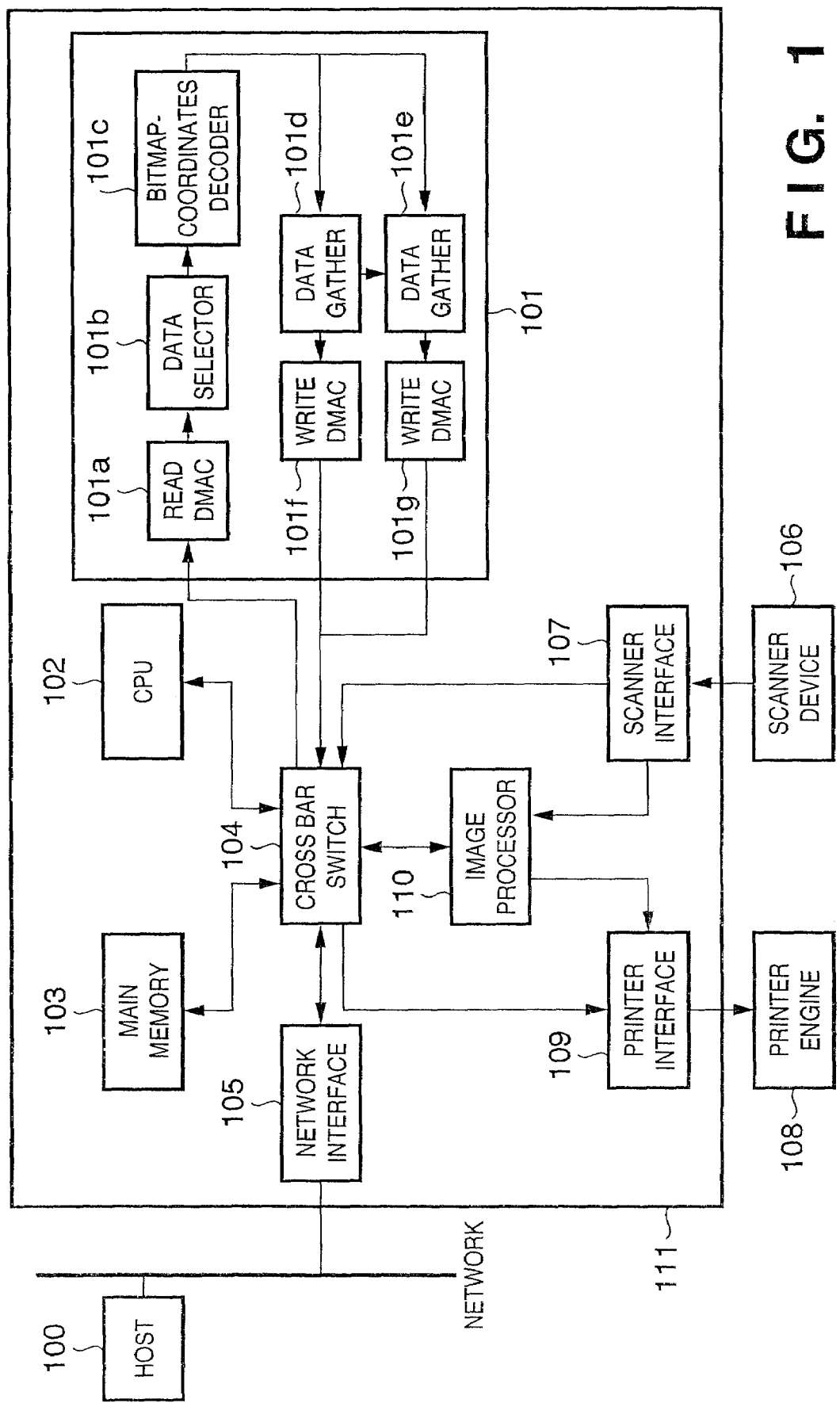
FIG. 1 is a block diagram of a composition of a first embodiment of the present invention.

FIG. 1 is a block diagram of a composition of a first embodiment of the present invention. An image scanned by a scanner 106 is transmitted to a multifunction controller 111 via a scanner interface 107. If the image thus acquired by the multifunction controller 111 is a multi-level image, then an image processor 110 binarizes the image. If the image thus acquired by the multifunction controller 111 is a binary image, then the image is stored directly in a main memory 103 via a cross bar switch 104. In order to prepare the binarized image for optical character recognition (OCR) processing, a CPU 102 activates the edge coordinates extraction circuit 101 and commences raster-to-vector conversion. When the edge coordinates extraction circuit 101 is activated, a read DMAC 101a acquires the binary image from the main memory 103 and sends the binary image to a data selector 101b.

The data selector 101b then converts the binary image into a stream of bytes and transmits the data stream to a bitmap coordinates decoder 101c. The bitmap coordinates decoder 101c decodes in parallel the x-coordinates of a plurality of edges and the number of edges (hereinafter sometimes referred to as the edge number) carried by the 1-byte binary image input from the data selector 101b, and transmits the results to a first data gather unit 101d (an x-coordinate data gather circuit). The first data gather unit 101d stores in a data buffer the x-coordinates of the edges acquired from the bitmap coordinates decoder 101c and adds the number of edges of the relevant line. When an amount of edge x-coordinate information capable of being transmitted to the memory is stored in the data buffer, the data gather unit 101d then transmits an edge x-coordinate list to an x-coordinate write DMAC 101f. The DMAC 101f then stores the data in a predetermined address in the main memory 103.

The bitmap coordinates decoder 101c then counts the number of bytes in the x direction, and when the end of a line is reached notifies the first data gather unit 101d that the count is finished. When the line end information is received the first data gather unit 101d transmits the sum of the edge numbers for that line and the address where edge coordinate data for the head of the line is stored to a second data gather unit 101e (y-coordinate data gather circuit). The second data gather unit 101e stores in the data buffer the edge number and storage address for each line, and when an amount of such information as can be transmitted is stored in the data buffer the second data gather unit 101e transmits the edge number and storage address for each line to a y-coordinate write DMAC 101g. The y-coordinate write DMAC 101g then stores the data at a predetermined address in the main memory 103.

The bitmap coordinates decoder 101c counts the number of lines in the y direction, and notifies the first data gather unit 101d that both the line and the process are finished when the final byte of the final line of a digital image is reached. When the process completion information is received the first data gather unit 101d sends all the x-coordinate data stored in the data buffer to the x-coordinate write DMAC 101f, and at the same time sends, together with the process completion information, the sum of the edge numbers of the line and the address where the edge coordinate data of the head of the line is stored. When the completion information is received, the second data gather unit 101e transmits the edge number and storage address for each line stored in the data buffer to the y-coordinate write DMAC 101g. The y-coordinate write DMAC 101g then stores the data to a predetermined address in the main memory 103 to complete the process.

When the edge coordinates extraction circuit 101 commences processing and the processing of two lines has been completed, the CPU 102 commences the last part of the raster-to-vector conversion process in parallel with the processing that continues to be performed by the edge coordinates extraction circuit 101.

Based on the edge coordinated information output by the edge coordinates extraction circuit 101, the CPU 102 investigates the continuity of the edges between adjacent lines and generates a vector. When the edge coordinates extraction circuit 101 and the CPU 102 complete processing, it becomes clear what kind of edges belong to the image objects that make up the binary image, and carries out OCR processing based on such information. When OCR is carried out it can be determined in which direction the character that forms the image scanned by the scanner 106 faces. Based on that information, the CPU 102 gathers N-up pages and the gathered page images are sent to a printer engine 108 via a printer interface 109, where the images are printed out.

Additionally, by subjecting bitmap font data downloaded from a host computer 100 via a network interface 105 to the multifunction controller 111 to the raster-to-vector conversion process described above, the downloaded bitmap font data can be used as graphic object data in a PDL rendering process.

Figure 2A:
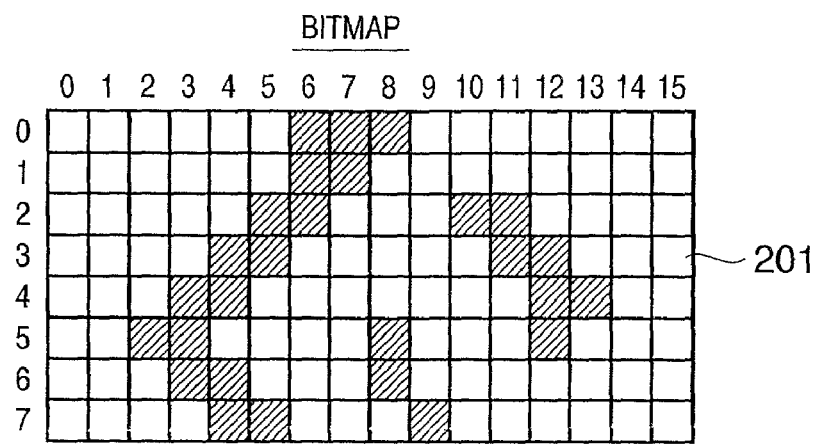
FIGS. 2A and 2B are pattern diagrams of a form of data generated by an edge coordinates extraction circuit of the first embodiment of the present invention.
Figure 2B:
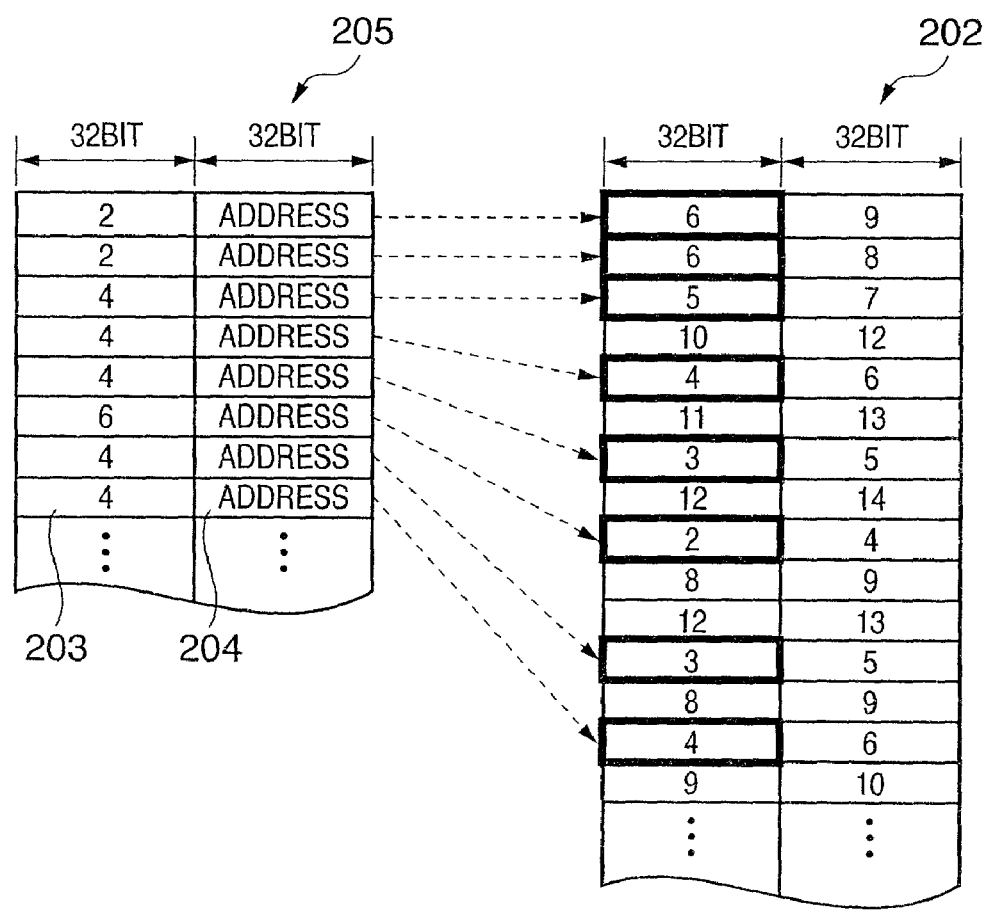

FIGS. 2A and 2B are pattern diagrams of a form of data generated by an edge coordinates extraction circuit of the first embodiment of the present invention. When an original digital image 201 is processed by the edge coordinates extraction circuit 101, a list 202 of the x-coordinates of the edges of each of the lines is written to the main memory 103 by the x-coordinate write DMAC 101f. Then, at the same time, a list 205 consisting of edge numbers 203 for each of the lines and addresses 204 (pointers) of lines indicating the head of the lines of the x-coordinates list 202 is written to the main memory 103 by the y-coordinate write DMAC 101g.

Figure 3:
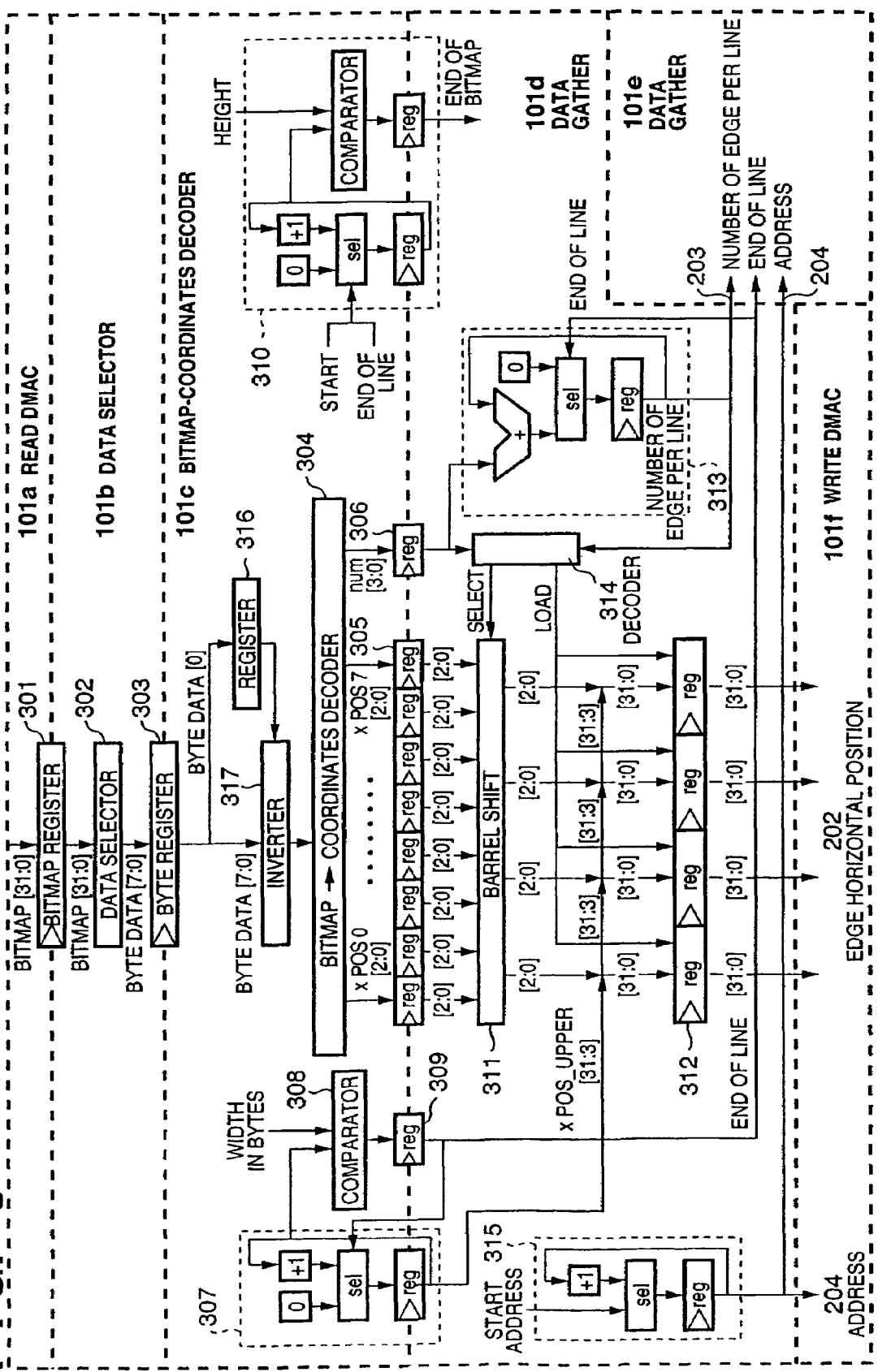
FIG. 3 is a block diagram showing a data bus of the edge coordinates extraction circuit of the first embodiment of the present invention.

FIG. 3 is a block diagram showing a data path of the edge coordinates extraction circuit of the first embodiment of the present invention.

The digital image data acquired by the data read DMAC 101a from the memory is stored in a bitmap register 301 and the bitmap data is then divided into bytes by a data selector 302 and stored in a byte register 303. The 8-bit byte data stored in the byte register 303 is then sent to an inverter 317. At the inverter 317, the byte data is inverted depending on the values stored in the register 316.

The LSB (least significant bit) of the preceding byte (at left) is stored in the register 316. If this value is 1, then the pixel at the right end of the byte data is dense. Therefore, in such a case, the total number of edges will be an odd number and there is a possibility that a non-edge coordinate will be recognized as an edge. Here, in order to adjust the edge position and the number of edges, the byte data is input to a bitmap coordinates decoder 304 after inversion by the inverter 317.

The bitmap coordinates decoder 304 contains lookup tables (LUTs) (see FIGS. 4, 5, 6, 7, 8 and 9) that match the value that indicates the 8-bit byte data with the edge position information and the edge number information. The edge position information and the edge number information can be decoded simultaneously from the byte data.

Thus, for example, in FIGS. 2A and 2B, the initial byte data from line 0 is the hexadecimal numeral 03, and the LSB is 1. Therefore, the register 316 holds this value 1 until the next byte data is output from the byte register 303. In this case, the next byte data is 80 in the hexadecimal system, and when this is held in the register 303 the inverter 317 converts 80 to 7f because the register 316 reads 1. As a result, the edge decoder 304 outputs edge number 1 and edge position 1, and adjustment between continuous byte data is carried out as appropriate.

The coordinate information for the positions of all the edges and the number of edges included in the byte data decoded by the bitmap coordinates decoder 304 are stored in the edge number register 306 and lower edge x-coordinate register 305. The bitmap coordinates decoder 101c retains the x-direction byte counter 307, which becomes the upper x-coordinate of the edge.

The lower edge x-coordinate register 305 is shifted by a barrel shifter 311 and combined with the upper x-coordinate counter 307 output, and then stored in the x-coordinate data gather combination register 312.

The number of edges in a byte is input to an edge number counter 313 and used to count the number of edges in a line. The last bit of the line-internal edge number and the output of the edge number register 306 that is the current byte edge number are then input to a decoder 314, and an amount of shift to be conducted by the barrel shifter 311 as well as a load signal for the x-coordinate data combination register 312 are generated.

A description will now be given of the barrel shifter 311, with reference to the image shown in FIG. 2A. The initial byte in line 0 is 03 in the hexadecimal system. The edge position is decoded by the decoder 304 and stored in the lower edge x-coordinate register 305 "6,0,0,0,0,0,0,0", as shown by line 3 of the byte data. Since this is the first byte, the decode amount output by the decoder 314 is 0. Therefore, the 6 that is the initial edge position is combined with the value 0 of the upper x-coordinate counter 307, so that the edge position becomes 6 and is retained at the left end of the register. The next byte in the 0 line is 80, and, since the LSB (least significant bit) of the preceding byte is 1, is converted to 7f by the inverter 317. Thereafter the value "1,0,0,0,0,0,0,0" is stored in the lower edge x-coordinate register 305 by the decoder 304. Since the sum of the number of edges of the 0 line is 1 by the initial byte, the decoder 314 directs the barrel shifter 311 to shift by 1 segment and outputs the four values from the left to the register 312. That is, the value "1,0,0,0,0,0,0,0" is output from the barrel shifter 311 as "0,1,0,0".

The upper x-coordinate counter 307 is counted up as 1 by the processing of the initial byte, and so is combined with the 1 of the barrel shifter 311 output "0,1,0,0". As a result, the binary number value 1001 and the decimal number value 9 are stored in the second register from the left of the register 312, thus generating the value "6,9" which corresponds to the first line in the address denoted by numeral 204 in FIG. 2B.

For convenience of explanation, the image for FIGS. 2A and 2B is 16 pixels per line, although the edge coordinates extraction circuit 101 shown here is more realistically adapted for handling images composed of $2^{32}$ pixels per line. Therefore, ultimately, a 32-bit edge coordinate is stored in the register 312.

When the x-coordinate data combination register 312 is full, the combined coordinate data is sent to the x-coordinate write DMAC 101f and stored in the main memory 103 as edge coordinate data 204. The storage address of the edge coordinate data 204 is then counted by the address counter 315, and the address at the head of the line is sent to the second data gather unit 101e.

In case a single output is not enough to output from the barrel register 311 to the register 312, then after the coordinate data is sent from the full register 312 to the write DMAC 101f, the values remaining in the barrel shifter 311 are shifted as appropriate and sent to the register 312.

The bitmap coordinates decoder 101c is compared by an end of line comparator 308 with the upper x-coordinate counter 307 value and the number of bytes in the length of the line. When the upper x-coordinate counter 307 value reaches the end of the line, a line end signal is retained by a line end register 309. When line end information is generated the address counter 315 value and the line edge number counter 313 value are sent to the y-coordinate data gather circuit 101e. The bitmap coordinates decoder 101c has a y-direction line counter 310 that counts the line end register 309 information and compares the information to the total number of lines in the bitmap image. When the number of lines reaches the end, the bitmap coordinates decoder 101c generates a process completion signal and instructs all the data held in the write DMAC 101f, 101g to be written to the memory 103, completing the entire process.

As described above, FIGS. 4 through 9 show a table of truth values showing the input and output of the bitmap coordinates decoder 304 of the present embodiment. The MSB of the present embodiment is the left end of the bitmap, 0 is white, 1 is black and the background is white, so when, for example, the byte register 303 output is 0×06, the bitmap coordinates decoder 304 decodes the byte register output so as to indicate that the number of edges output is 2, a position of a first edge (lower x-coordinate) is 5, and a position of a second edge (lower x-coordinate) is 7, with 0 being decoded for the value that denotes a third edge or more. Such data is then stored in the edge number register 306 and the lower x-coordinate register 311.

It should be noted that the tables shown in FIGS. 4–9 are merely illustrative and not exhaustive. Provided it matches and stores byte data values, edge coordinate information and edge number information, any table can be adapted to the present invention.

As described above, according to the present embodiment, the edge extraction process that is the first part of the raster-to-vector conversion can be carried out rapidly. Further, by using software loaded in a CPU to carry out the process of inferring the relation between edges and generating edge information parallel to the edge extraction process, it becomes possible to reduce the time needed to carry out the object edge information generating process.

A description will now be given of an image processing apparatus and an image processing method according to a second embodiment of the present invention.

As described above, a rendering method that generates final pixel information directly from the edge information and the layer information of the objects to be drawn has been proposed in Japanese Laid-Open Patent Application No. 2000-137825. In this method, what kinds of objects exist is determined from the object edge information, and then what object exists on the surface is determined from the layering of the objects, and finally, from the color information of the object resting on top, the color of the current pixel is determined. Production of each and every pixel is carried out in a similar manner, one pixel at a time. As a result, the need to carry out large volumes of read-modify-write operations when rendering the object in the memory is eliminated. The advantage thus gained is that the time needed for rendering does not increase dramatically even if the resolution and fineness increase.

However, with the method described above, edge information for the object must be obtained prior to rendering the object. Many alphanumeric characters are included in any ordinary textual matter to be printed, for example, but even so it is necessary to obtain edge information for the character font objects. Given the large variety of alphanumeric characters and the complexity of their edges, a drawback arises in that extensive time is required for the edge extraction process.

In the present embodiment, an edge coordinates extraction circuit that uses a decoder for bitmap-edge coordinate conversation is employed, thus increasing the speed of the first part of the process of extracting edge information. Further, by using software loaded into a CPU to execute the last part of the process parallel to and partially overlapping with the first part of the process, the time needed for the edge information extracting process can be reduced.

Figure 10:
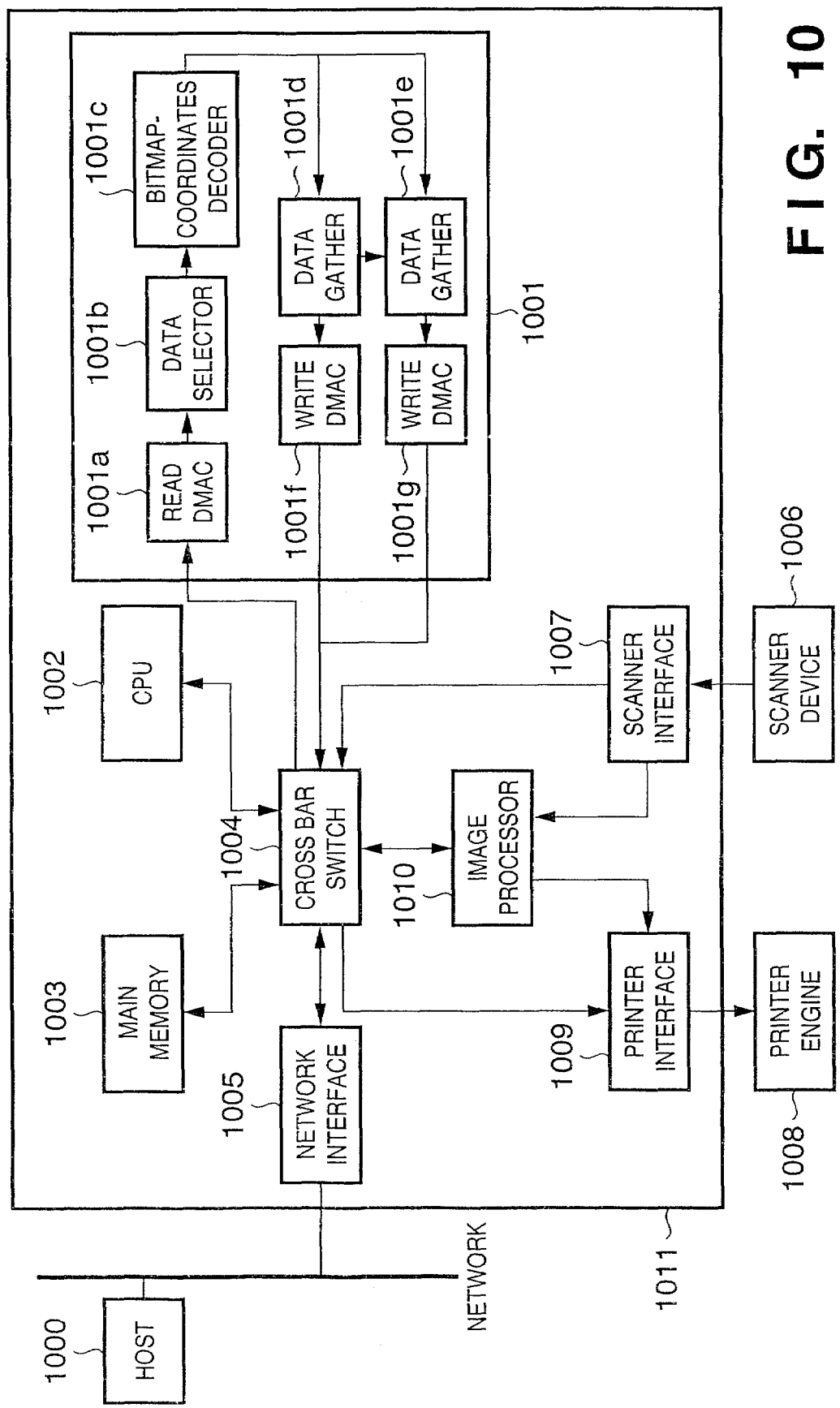
FIG. 10 is a block diagram of a composition of a second embodiment of the present invention.

FIG. 10 is a block diagram of a composition of a second embodiment of the present invention. Print information generated by a host computer 1000 is sent to a multifunction controller 1011 via a network. The print information received by the network interface 1005 is stored once in a main memory 1003 via a cross bar switch 1004. Next, a CPU 1002 begins to analyze the print information stored in the main memory 1003 and generates graphic object edge information, layer information, color information and the like as a display list in a separate region of the main memory 1003. If the graphic object is an alphanumeric character, then the CPU 1002 searches a font cache for the alphanumeric character. If the search results in a cache hit, then the CPU 1002 adds the edge information registered in the font cache to the display list. If the search results in a cache miss, the CPU 1002 generates the unrecognized font in a separate region in the bitmap font main memory 1003 and then continues with the next edge information extraction process.

In order to extract the bitmap font edge information, the CPU 1002 first supplies the edge coordinates extraction circuit 1001 with the memory address where the bitmap font is stored. When the edge coordinates extraction circuit 1001 is thus activated, the read DMAC 1001a obtains the bitmap font image from the main memory 1003 and sends it to a data selector 1001b.

The data selector 1001b then converts the bitmap image into a stream of bytes and transmits the data stream to a bitmap coordinates decoder 1001c. The bitmap coordinates decoder 1001c decodes in parallel the x-coordinates of a plurality of edges and the edge number carried by the 1-byte bitmap image input from the data selector 1001b, and transmits the results to a first data gather unit 1001d (an x-coordinate data gather circuit). The first data gather unit 1001d stores in a data buffer the x-coordinates of the edges acquired from the bitmap coordinates decoder 1001c and adds the number of edges of the relevant line. When an amount of edge x-coordinate information capable of being transmitted to the memory is stored in the data buffer, the data gather unit 1001d then transmits an edge x-coordinate list to an x-coordinate write DMAC 1001f. The DMAC 1001f then stores the data in a predetermined address in the main memory 1003.

The bitmap coordinates decoder 1001c then counts the number of bytes in the x direction, and when the end of a line is reached notifies the first data gather unit 1001d that the count is finished. When the line end information is received the first data gather unit 1001d transmits the sum of the edge numbers for that line and the address where edge coordinate data for the head of the line is stored to a second data gather unit 1001e (y coordinate data gather circuit). The second data gather unit 1001e stores in the data buffer the edge number and storage address for each line, and when an amount of such information as can be transmitted is stored in the data buffer the second data gather unit 1001e transmits the edge number and storage address for each line to a y-coordinate write DMAC 1001g. The y-coordinate write DMAC 1001g then stores the data at a predetermined address in the main memory 1003.

The bitmap coordinates decoder 1001c counts the number of lines in the y direction, and notifies the first data gather unit 1001d that both the line and the process are finished when the final byte of the final line of a digital image is reached. When the process completion information is received the first data gather unit 1001d sends all the x-coordinate data stored in the data buffer to the x-coordinate write DMAC 1001f, and at the same time sends, together with the process completion information, the sum of the edge numbers of the line and the address in which is stored the edge coordinate data of the head of the line. When the completion information is received, the second data gather unit 1001e transmits the edge number and storage address for each line stored in the data buffer to the y-coordinate write DMAC 1001g. The y-coordinate write DMAC 1001g then stores the data to a predetermined address in the main memory 1003 to complete the process.

When the edge coordinates extraction circuit 1001 commences processing and the processing of two lines has been completed, the CPU 1002 commences the last part of the raster-to-vector conversion process in parallel with the processing that continues to be performed by the edge coordinates extraction circuit 1001.

Based on the edge coordinated information output by the edge coordinates extraction circuit 1001, the CPU 1002 investigates the continuity of the edges between adjacent lines and generates a vector. When the edge coordinates extraction circuit 1001 and the CPU 1002 complete processing, the bitmap font edge information is obtained. The CPU 1002 registers the edge information in both the font cache and the display list.

When a page worth of display list is generated as described above, the CPU 1002 uses the display list to render the objects, generating the image to be printed in the main memory 1003. The image so generated is sent from the printer interface 1009 to the printer engine 1008 via the cross bar switch 1004 and an image processing circuit 1010. At the printer engine 1008, the received image is recorded onto paper that is a recording medium, thereby obtaining the final printout.

Figure 11A:
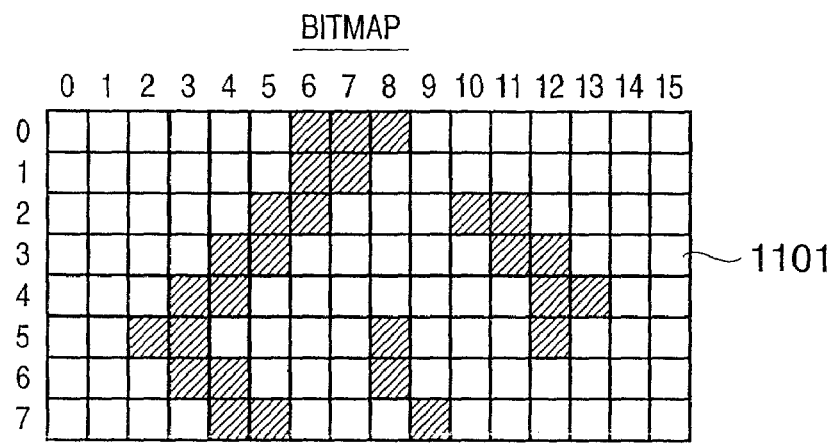
FIGS. 11A and 11B are schematic diagrams of a form of data generated by an edge coordinates extraction circuit of the second embodiment of the present invention.
Figure 11B:
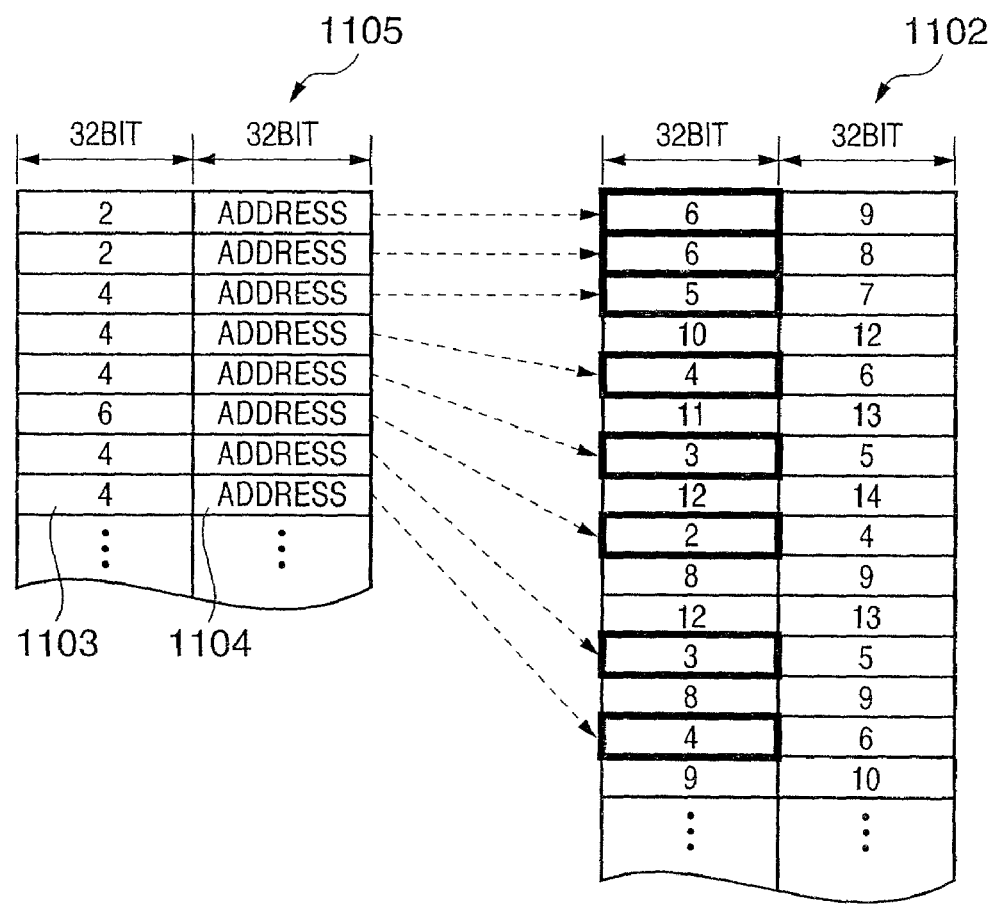

FIGS. 11A and 11B are pattern diagrams of a form of data generated by an edge coordinates extraction circuit of the second embodiment of the present invention. When an original bitmap image 1101 is processed by the edge coordinates extraction circuit 1001, a list 1102 of the x-coordinates of the edges of each of the lines is written to the main memory 1003 by the x-coordinate write DMAC 1001f. Then, at the same time, a list 1105 consisting of edge numbers 1103 for each of the lines and addresses (pointers) 1104 of lines indicating the head of the lines of the x-coordinates list 1102 is written to the main memory 1003 by the y-coordinate write DMAC 1001g.

Figure 12:
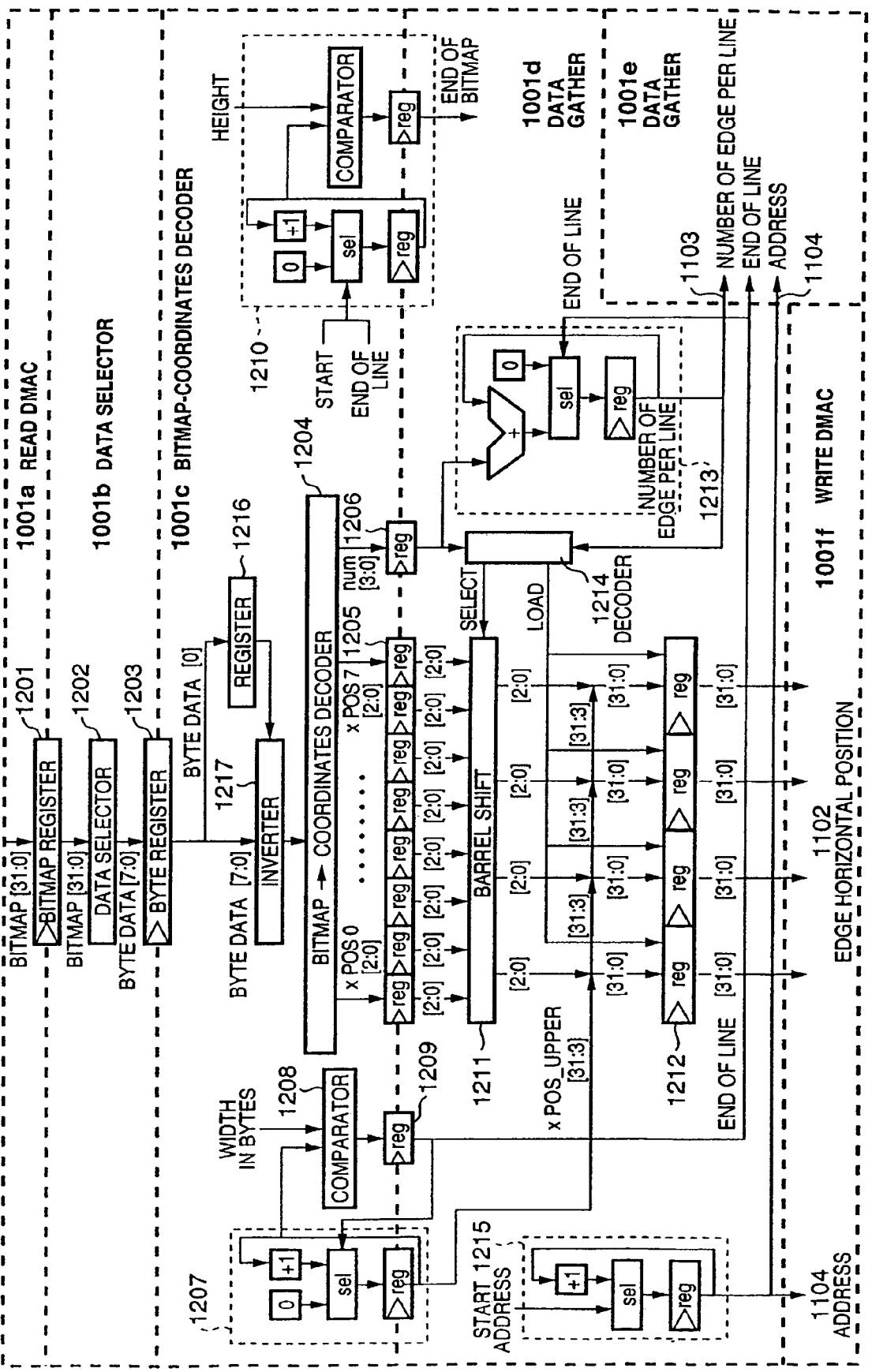
FIG. 12 is a block diagram showing a data bus of the edge coordinates extraction circuit of the second embodiment of the present invention.

FIG. 12 is a block diagram showing a data path of the edge coordinates extraction circuit of the second embodiment of the present invention.

The bitmap image data acquired by the data read DMAC 1001a from the memory is stored in a bitmap register 1201 and the bitmap data is then divided into bytes by a data selector 1202 and stored in a byte register 1203. The bitmap data stored in the byte register 1203 is then sent to an inverter 1217. At the inverter 1217, the byte data is inverted depending on the values stored in the register 1216.

The LSB (least significant bit) of the preceding byte (at left) is stored in the register 1216. If this value is 1, then the pixel at the right end of the byte data is dense. Therefore, in such a case, the total number of edges will be an odd number and there is a possibility that a non-edge coordinate will be recognized as an edge. Here, in order to adjust the edge position and the number of edges, the byte data is input to a bitmap coordinates decoder 1204 after inversion by the inverter 1217.

The bitmap coordinates decoder 1204 contains look-up tables (LUTs) (see FIGS. 4, 5, 6, 7, 8 and 9) that match the value that indicates the 8-bit byte data with the edge position information and the edge number information. The edge position information and the edge number information can be decoded simultaneously from the byte data.

The coordinate information for the positions of all the edges and the number of edges included in the byte data decoded by the bitmap coordinates decoder 1204 are stored in the edge number register 1206 and lower edge x-coordinate register 1205. The bitmap coordinates decoder 1001c retains the x-direction byte counter 1207, which becomes the upper x-coordinate of the edge.

The lower edge x-coordinate register 1205 is shifted by a barrel shifter 1211 and combined with the upper x-coordinate counter 1207 output, and then stored in the x-coordinate data gather combination register 1212.

The number of edges in a byte is input to an edge number counter 1213 and used to count the number of edges in a line. The last bit of the line-internal edge number and the output of the edge number register 1206 that is the current byte edge number are then input to a decoder 1214, and an amount of shift to be conducted by the barrel shifter 1211 as well as a load signal for the x-coordinate data combination register 1212 are generated.

The operation of the barrel shifter 1211 is the same as that described with reference to the sample image of FIG. 2A, and so a description thereof is omitted here.

When the x-coordinate data combination register 1212 is full, the combined coordinate data is sent to the x-coordinate write DMAC 1001f and stored in the main memory 1003 as edge coordinate data 1104. The storage address of the edge coordinate data 1104 is then counted by the address counter 1215, and the address at the head of the line is sent to the second data gather unit 1001e.

In case a single output is not enough to output from the barrel register 1211 to the register 1212, then after the coordinate data is sent from the full register 1212 to the write DMAC 1001f, the values remaining in the barrel shifter 1211 are shifted as appropriate and sent to the register 1212.

The bitmap coordinates decoder 1001c is compared by an end of line comparator 1208 with the upper x-coordinate counter 1207 value and the number of bytes in the length of the line. When the upper x-coordinate counter 1207 value reaches the end of the line, a line end signal is retained by a line end register 1209. When line end information is generated the address counter 1215 value and the line edge number counter 1213 value are sent to the y-coordinate data gather circuit 1001e. The bitmap coordinates decoder 1001c has a y-direction line counter 1210 that counts the line end register 1209 information and compares the information to the total number of lines in the bitmap image. When the number of lines reaches the end, the bitmap coordinates decoder 1001c generates a process completion signal and instructs all the data held in the write DMAC 1001f, 1001g to be written to the memory 1003, completing the entire process.

A description will now be given of the software processing of the present invention.

Figure 13:
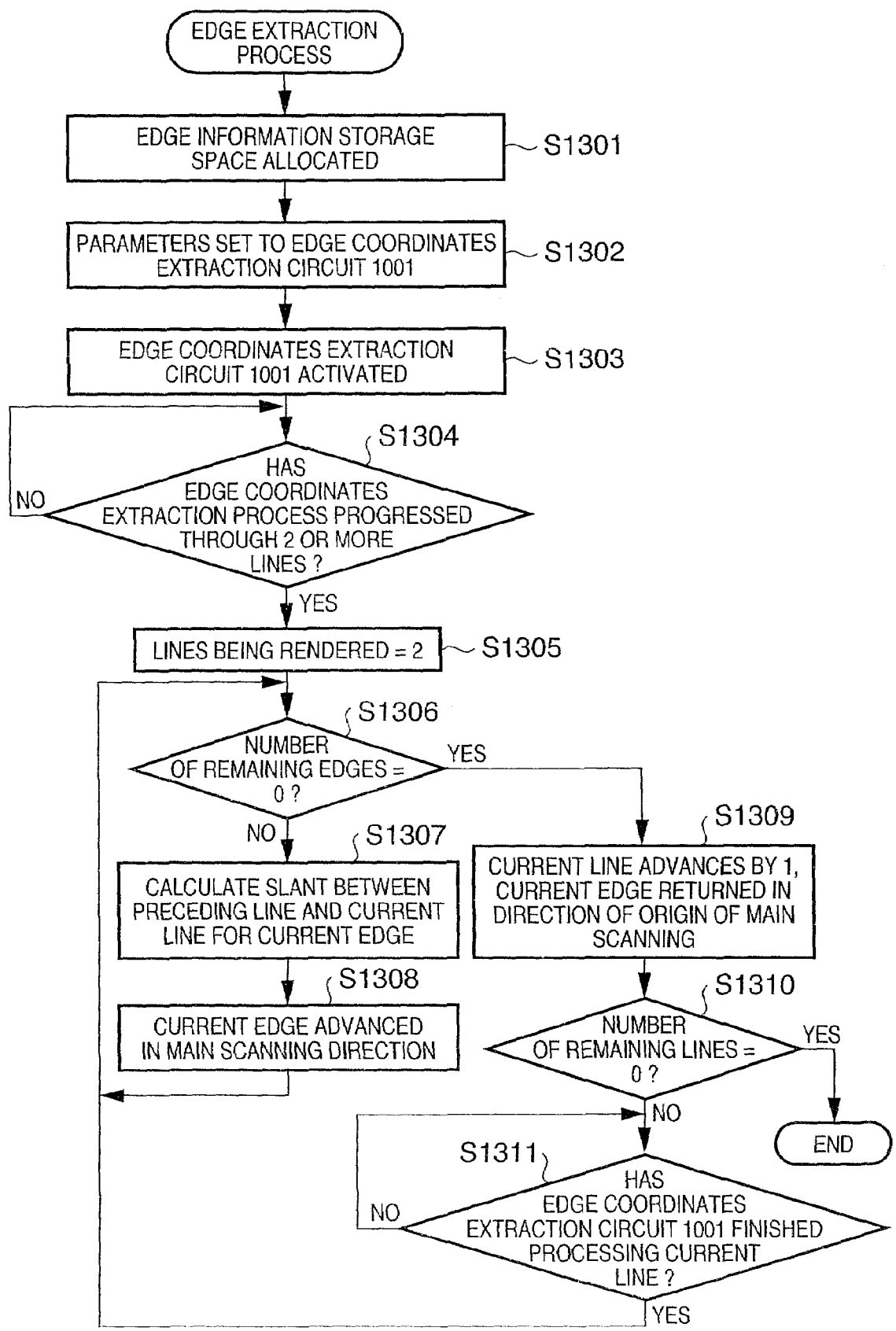
FIG. 13 is a flowchart showing a software sequence of an edge extraction process of the second embodiment of the present invention.

FIG. 13 is a flowchart showing a software sequence of an edge extraction process of the second embodiment of the present invention. It should be noted that the process shown in the flow chart is executed by the CPU 1002 based on a program previously stored in the main memory 1003.

First, space in the memory for storing the edge information generated by the edge coordinates extraction circuit 1001 is allocated in a step S1301, and then the parameters such as the address where is stored the bitmap font required by the edge coordinates extraction circuit 1001 are set in a step S1302, after which the edge coordinates extraction circuit 1001 is activated and the edge coordinates extraction process is commenced in a step S1303.

Next, in a step S1304, it is determined whether or not the edge coordinates extraction circuit 1001 has processed two lines or more, and if not then the process continues until the edge coordinates extraction circuit 1001 has processed two or more lines. If it is determined that the edge coordinates extraction circuit 1001 has processed two or more lines, then the second line is specified as the current line and a process of generating edge information from the edge coordinates is commenced in a step S1305, parallel to the edge coordinates extraction process.

The process of generating edge information from the edge coordinates is premised on the initial value of the current edge facing the direction of origin of the main scanning, and in a step S1306 initially determines if the number of unprocessed edges of the current line is 0.

In step S1306, if the number of unprocessed edges is greater than zero, then the slant of the current edge when moving from the preceding line to the current line is calculated and added to the edge information in a step S1307. Next, the current edge is advanced in the main scanning direction in a step S1308 and the process returns to step S1306, where it is again determined if the number of unprocessed edges is 0.

In step S1306, if the number of unprocessed edges is zero, then the current line advances by 1 and the current edge is returned in the direction of the starting point of the main scanning in a step S1309. Next, in a step S1310 it is determined if all lines of the bitmap have been processed, in other words, if the number of remaining lines is 0. If lines remain, then it is determined if the edge coordinates extraction circuit 1001 has finished processing the current line in a step S1311. If processing of the current line is not finished, then the process returns to step S1306. If, however, processing of all lines of the bitmap is finished, then the process terminates.

In the present embodiment, the table of truth values indicating the input and output of the bitmap coordinates decoder 1204 is the same as the table of truth values depicted in FIGS. 4–9 with reference to the first embodiment of the present invention. In the present embodiment, the MSB is the left end of the bitmap, 0 is white, 1 is black and the background is white, so a byte register 1203 output of 0×06, for example, is decoded as the edge number output is 2, the position (lower x-coordinate) of the first edge is 5, the position (lower x-coordinate) of the second edge is 7, with 0 being decoded for the value that denotes a third edge or more. Such data is then stored to the edge number register 1206 and the lower x-coordinate register 1203.

It should be noted that although the present embodiment, like the first embodiment described above, uses the tables shown in FIGS. 4–9, such tables are merely illustrative of the present invention and not exhaustive. As can be appreciated by those of ordinary skill in the art, other, specialized tables can be adapted for use in the rendering process.

As described above, according to the present embodiment, the edge extraction process that is the first part of the object edge information generating process can be carried out rapidly. Further, by using software loaded in a CPU to carry out the process of inferring the relation between edges and generating edge information parallel to the edge extraction process, it becomes possible to reduce the time needed to carry out the object edge information generating process.

The above-described advantage of the present invention is particularly noticeable in the case of rendering textual matter, which includes large numbers of alphanumeric characters, because the edge extraction process can be carried out quickly, in font object units, thus making high-speed print processing possible.

As many apparently widely different embodiments of the present invention can be made without departing from the spirit and scope thereof, it is to be understood that the invention is not limited to the specific preferred embodiments described above thereof except as defined in the claims.

What is claimed is:

1. An image processing apparatus for processing an input bitmap image formed of lines of pixels, the image processing apparatus comprising:
    an edge coordinates extraction circuit for performing extraction processing which extracts edge coordinates information of graphic objects included in each line of the input bitmap image on a line by line basis, wherein the edge coordinates information includes coordinates or points at which a density of the pixels changes in each line of the input bitmap image; and
    a CPU for executing conversion processing which converts the input bitmap image into vector data based on the edge coordinates information extracted by said edge coordinates extraction circuit,
    wherein said CPU begins to execute the conversion processing after said edge coordinates extraction circuit extracts the edge coordinates information from two successive lines of the input bitmap image, and continues to execute the conversion processing simultaneously to a following extraction processing performed by said edge coordinates extraction circuit.

2. The image processing apparatus according to claim 1, wherein the converting of the input bitmap image into vector data by said CPU is a software process executed in parallel with a hardware process performed by said edge coordinates extraction circuit.

3. The image processing apparatus according to claim 1. wherein the edge coordinates information further includes an edge number representing a number of the points at which the density of the pixels changes in each line of the input bitmap image.

4. The image processing apparatus according to claim 1, wherein the input bitmap image comprises a binary bitmap image acquired by scanning an image with a scanner.

5. The image processing apparatus according to claim 1, further comprising optical character recognition (OCR) means for OCR processing of the input binary bitmap image based on the vector data converted.

6. The image processing apparatus according to claim 1, wherein the graphic objects comprise character images.

7. The image processing apparatus according to claim 6, further comprising generating means for generating a final pixel from layer information expressing a vertical spacing relationship between graphic objects and from the vector data.

8. The image processing apparatus according to claim 1, wherein said edge coordinates extraction circuit comprises:
- extracting means for extracting bytes of n consecutive bits of data from tile input bitmap image;
- decoding means for simultaneously decoding edge coordinates information, including an edge number, from the bytes extracted by said extracting means; and
- data gathering means for gathering the edge coordinates information, including the edge number, for each byte extracted by said decoding means.

9. The image processing apparatus according to claim 8, further comprising adjustment means for adjusting the edge coordinates information between adjacent bytes.

10. The image processing apparatus according to claim 8, wherein said decoding means decodes the edge coordinates information using a look-up table (LUT) for storing values indicating the bytes extracted by said extracting means together with data corresponding to the edge coordinates information, including the edge number.

11. The image processing apparatus according to claim 8, further comprising storage means for storing the edge number and the edge coordinates of the edge coordinates information for each line in different regions of an address memory.

12. The image processing apparatus according to claim 11, wherein the storage means stores in the address memory a first list that includes the edge coordinates of beginning and ending points at which the density of the pixels changes, and a second list that includes an address of the edge coordinates information stored in the first list and the edge number information for each line.

13. The image processing apparatus according to claim 8, wherein the bytes are 8-bit byte data.

14. An image processing method for processing an input bitmap image formed of lines of pixels, the image processing method comprising:
- an edge coordinates extraction step of performing extraction processing which extracts edge coordinates information of graphic objects included in each line of the input bitmap image, on a line by line basis, using an edge coordinates extraction circuit, wherein the edge coordinates information includes coordinates of points at which a density of the pixels changes in each line of the input bitmap image; and
- a conversion step of executing conversion processing which converts, with a CPU, the input bitmap image into vector data based on the edge coordinates information extracted in said edge coordinates extraction step.
- wherein the CPU begins to execute said conversion step after the edge coordinates information from two successive lines of the input bitmap image is extracted in said edge coordinates extraction step, and continues to perform said conversion step simultaneously to a following extracting performed in said edge coordinates extraction step.

15. An image processing method according to claim 14, wherein
- said edge coordinates extraction step is executed as a hardware process and said conversion step is executed as a software process.

* * * * *

UNITED STATES PATENT AND TRADEMARK OFFICE
CERTIFICATE OF CORRECTION

PATENT NO. : 7,119,807 B2
APPLICATION NO. : 10/119759
DATED : October 10, 2006
INVENTOR(S) : Nobuaki Matsui It is certified that error appears in the above-identified patent and that said Letters Patent is hereby corrected as shown below:

COLUMN 2

Line 64, "information," should read --information, ¶ --.

COLUMN 5

Line 5, "coordinated" should read --coordinates--.

COLUMN 8

Line 8, "conversation" should read --conversion--.

COLUMN 10

Line 46, "barrel register 1211" should read --barrel shifter 1211--.

COLUMN 12

Line 31, "image" should read --image,--;
Line 33, "or" should read --of--; and
Line 51, "Claim 1." should read --Claim 1,--.

COLUMN 13

Line 7, "tile" should read --the--.

UNITED STATES PATENT AND TRADEMARK OFFICE
CERTIFICATE OF CORRECTION

PATENT NO. : 7,119,807 B2
APPLICATION NO. : 10/119759
DATED : October 10, 2006
INVENTOR(S) : Nobuaki Matsui It is certified that error appears in the above-identified patent and that said Letters Patent is hereby corrected as shown below:

<u>COLUMN 14</u>

Line 19, "step." should read --step,--.

Signed and Sealed this

Third Day of July, 2007

JON W. DUDAS
*Director of the United States Patent and Trademark Office*